Patented Feb. 20, 1923.

1,445,637

UNITED STATES PATENT OFFICE.

ISADOR MILLER, OF NEW YORK, N. Y., ASSIGNOR TO WILLIAM M. GROSVENOR, OF NEW YORK, N. Y.

CONVERTING AROMATIC HALOGEN SUBSTITUTION PRODUCTS INTO AMINES.

No Drawing.   Application filed June 27, 1919. Serial No. 307,206.

*To all whom it may concern:*

Be it known that I, ISADOR MILLER, citizen of the United States, and resident of New York city, in the county of Bronx and State of New York, have invented certain new and useful Improvements in Converting Aromatic Halogen Substitution Products into Amines, of which the following is a specification.

My invention relates to improvements in processes for converting aromatic halogen substitution products into corresponding amido substitution products.

The main object of my invention is to provide a method by which very much larger yields may be obtained than heretofore and in a more efficient manner. I am aware that it has heretofore been suggested that 150 parts of dichlorbenzol, 750 parts of 25% ammonia liquor, and 20 parts of copper sulphate may be heated in an autoclave for about 20 hours, first at 170°–180° C. and finally at 200° C. to replace some of the halogen with the ammonia radical but so far as I am aware this has not produced commercial yields. If for instance 150 parts dichlorbenzol are placed in an autoclave of proper size and 750 parts of 25% ammonia liquor are added and then 20 parts of copper sulphate put in, pressures exceeding 1000 lbs. per sq. in. are produced by heating even to 170°–180° and the proportion of dichlorbenzol converted into diamidobenzol is very small, i. e. from 5–15% even though the heating is continued for 24 hrs. A large proportion of the dichlorbenzol is found unconverted as a cake solidified on the bottom of the autoclave if the latter is cooled and examined and yields are satisfactory only in the sense that the unconverted dischlorbenzol may be recovered practically intact. The copper sulphate is heavy and slowly soluble in strong ammonia with the evolution of much heat which cause the copper sulphate I believe to settle to the bottom of the ammonia in the autoclave and there react with the strong ammonia producing heat which melts the aromatic body and allows the copper sulphate to become coated therewith and remain practically inert. Instead of this I carry out the process so that the copper compound is in a highly dispersed condition in the batch and I find that by so doing the copper compound is rendered much more active so that the halogen compound is substantially completely converted or the major portion of it converted to the corresponding amido product. To this end I preferably use some already freshly precipitated and suspended or fully dissolved form of copper salt, preferably the cuprammonium sulphate. This has the advantage that it may readily be formed by the separate and unobstructed action of the ammonia on copper sulphate preferably in the absence of the aromatic chlor body, that it is largely soluble in ammonia and if an excess is formed it may be held suspended in the liquid and evenly distributed throughout the liquid in an almost colloidal state of division, thereby subjecting the aromatic chlor body at all times to the most reactive form of the copper compound in highly dispersed condition in either colloidal or dissolved state.

Also I have found that by avoiding the great excess of ammonia (based on the weight of the aromatic dichlor body) and by using less than 120% excess and preferably only about 10% to 20% more than the theoretical amount required I can not only avoid the use and recovery of such quantities of ammonia but also am able to better carry out the reaction with agitation if desired, with easily controlled commercial pressures between 350 and 700 lbs. per sq. in. I, therefore, prefer to carry out the reaction under pressures substantially less than 1000 pounds per square inch, and with such pressures it is far more feasible to provide continuous agitation in the autoclave which tends to further maintain the high degree of dispersion of the reagent.

I have also found that to secure most rapid results it is desirable not to raise the temperature gradually until the end of the reaction but that it is preferable to heat the charge as rapidly as possible to about 200° C. and maintain about this temperature, and a further advantage (made possible by the soluble character of my copper compound) resides in the increased quantity of copper I am thus enabled to use and effectively bring into action. In the previous method much less than 3% of copper (by weight of the dichlor body) was effectively used whereas according to my improvements generally about 3% is rendered not only effective but extremely active by reason of its dispersed condition.

As an example of one way in which my process may be carried out, I take 120 pounds of ordinary commercial copper sulphate (known as blue vitriol) and dissolve the same in 128 pounds of boiling water and add this solution preferably with stirring to 1040 pounds of concentrated ammonia liquor, 28%. This causes I believe the formation of so-called cuprammonium sulphate, $Cu(NH_3)_4SO_4$ in solution or in an exceedingly fine state of subdivision, or both, in which condition I find this substance is very reactive and suitable for functioning as an ammonia carrier. To insure the most complete solution I prefer to agitate for a short time till the liquid becomes as nearly a clear blue solution as possible. This is preferably done outside the autoclave where the procedure can more readily be observed. I now add in the autoclave 450 pounds of solid paradichlorbenzol preferably well ground and after all has been added to the autoclave close the autoclave, start the agitator, if one is used, and bring up the temperature as rapidly as possible to 195–200° C. and maintain the temperature at this point for 14–16 hours, during which the pressure will vary from 550–600 pounds per square inch at the beginning to about 250 pounds when conversion has been completed. I prefer that the amount of copper compound present be about 20% or less by weight of the halogen product. The end of the reaction is shown by the fact that the pressure at constant temperature no longer decreases. I find that practically 100% of the paradichlorbenzol has been converted into the corresponding amido substitution product, para-phenylene-diamine, so that in many cases not even the faintest odor of the chlor body can be detected. A somewhat longer or shorter time may be required depending on the effectiveness of dispersion of the copper salt, and the agitation if used. The excess of ammonia may be varied but I prefer to use from 10% to 20% in excess of the theoretical quantity required to make the cuprammonium compound, to enter into the place of the halogen removed and to form ammonium chloride with the halogen removed. The strength of the ammonia may also be varied somewhat but I prefer to have enough water present to dissolve when cool the ammonium chloride formed in the reaction and the copper salts and ammonia remaining after the reaction is complete. The remaining ammonia may be neutralized or expelled as preferred. By carrying out the process in the manner described I can open the autoclave through a pressure filter at the conclusion of the run and filter the hot liquor directly from the autoclave by its own pressure, into a neutralizing and stabilizing bath maintained at a low temperature and allow the product to crystallize out and then centrifugally separate and dry it.

It will be clear to those skilled in the art that other aromatic halogen substitution products may be converted to the amido compounds in the same general way. After the reaction has started it is questionable whether the ammonia compound does not exist to some extent as chloride and in this form continue to act as a catalyst, but in any event it is obvious that other forms of copper compounds or catalysts may be used since the reaction seems to be largely catalytic. Likewise, having pointed out the new technical results obtained by having the copper compound in a highly dispersed condition whereby the major portion of the aromatic halogen body is converted to the corresponding amido compounds, it will be obvious to those skilled in the art that many different methods may be employed for obtaining the required dispersion. Other changes and modifications may be made and consequently I do not desire to be limited to the details given in connection with the specific example set forth since the invention may be embodied in widely differing forms.

What I claim as new and desire to secure by Letters Patent, is:

1. In the process of converting aromatic halogen substitution products into amido substitution products, the step which consists in subjecting the halogen product to the action of ammonia in the presence of a catalyst, both the ammonia and catalyst being highly dispersed in the batch to convert the major portion of the halogen product to the corresponding amido product, and the reaction being carried out under pressures below 1000 pounds per square inch.

2. In the process of converting aromatic halogen substitution products into amido substitution products, the step which consists in subjecting the halogen product to the action of a copper ammonium compound in highly dispersed condition in the presence of ammonia.

3. In the process of converting aromatic halogen substitution products into amido substitution products, the step which consists in subjecting the halogen product to the action of ammonia in the presence of a catalyst, both the ammonia and catalyst being highly dispersed in the batch to convert the major portion of the halogen product to the corresponding amido product.

4. In the process of converting aromatic halogen substitution products into amido substitution products, the step which consists in subjecting the halogen product to the action of a copper and ammonia compound, the copper compound being highly dispersed in the batch to convert the major portion of the halogen product to the amido compound.

5. In the process of converting aromatic halogen substitution products into amido substitution products, the step which consists in subjecting the halogen product to the action of cupra ammonium sulphate in highly dispersed condition in the batch to substantially completely convert the halogen product to the corresponding amido product.

6. The process of converting aromatic chlorine substitution products into the corresponding amido substitution products which consists in subjecting the chlorine product to the action of a copper compound in highly dispersed condition in the presence of ammonia.

7. The process of converting dichlorbenzol into the corresponding amido substitution product which consists in subjecting the chlorine product to the action of a copper compound in the presence of ammonia, the copper compound being highly dispersed in the batch to convert the major portion of the halogen product to the amido compound.

8. In the process of converting aromatic halogen substitution products into amido substitution products, the step which consists in subjecting the halogen product to the action of a copper ammonia compound and ammonia, the copper compound being highly dispersed in the batch to convert the major portion of the halogen product to the amido compound and the ammonia being present in excess of not more than about 120% of the theoretical requirement.

9. The process of making paraphenylenediamine by subjecting paradichlorbenzol to the action of a copper ammonia compound, the copper compound being highly dispersed in the batch to convert the major portion of the dichlorbenzol to paraphenylenediamine.

10. In the process of making paraphenylene-diamine the step which consists in subjecting paradichlorbenzol to the action of ammonia and a cupra-ammonium catalyst, the ammonia and catalyst being highly dispersed in the batch to convert the major portion of the paradichlorbenzol to the amido product and the reaction being carried out under pressures below 1000 pounds per square inch.

11. In the process of making paraphenylenediamine from paradichlorbenzol the step which consists in subjecting the paradichlorbenzol to the action of cupra ammonium sulfate in highly dispersed condition in the batch to substantially completely convert the halogen product to the corresponding amido product.

Signed at New York city in the county of New York and State of New York this 25th day of June A. D. 1919.

ISADOR MILLER.